United States Patent

McDougall et al.

[15] 3,669,905

[45] June 13, 1972

[54] ELECTRICAL CONDUCTORS

[72] Inventors: Ian Leitch McDougall; Michael Charles Lock, both of Sutton Coldfield, England

[73] Assignee: Imperial Metal Industries (Kynoch) Limited, Birmingham, England

[22] Filed: May 6, 1970

[21] Appl. No.: 35,277

[30] Foreign Application Priority Data

May 13, 1969 Great Britain......................24,270/69
Sept. 26, 1969 Great Britain......................47,555/69

[52] U.S. Cl..............................................252/512, 252/518
[51] Int. Cl...........................................................H01b 1/02
[58] Field of Search.................................252/500, 512, 518

[56] References Cited

UNITED STATES PATENTS

| | | | |
|---|---|---|---|
| 3,380,935 | 4/1968 | Ring | 252/512 |
| 3,509,071 | 4/1970 | Goldstein | 252/512 |
| 3,448,062 | 6/1969 | Alden et al. | 252/518 |

*Primary Examiner*—Douglas J. Drummond
*Attorney*—Cushman, Darby & Cushman

[57] ABSTRACT

An electrical conductor comprising at least one core having superconducting properties and embedded in a matrix of a plastic material, said core comprising at least one superconductor filament having a maximum thickness of five microns, preferably one micron. Also methods of manufacture of such a conductor.

10 Claims, No Drawings

ELECTRICAL CONDUCTORS

FIELD OF THE INVENTION

This invention relates to electrical conductors and is particularly concerned with electrical conductors which have superconductive properties at cryogenic temperatures, i.e., at temperatures of the order of the boiling point of liquid helium, which is about 4.2° K. The invention also relates to methods of manufacture of electrical conductors.

BACKGROUND OF THE INVENTION

Various electrical conductors having superconductive properties have been suggested and manufactured, and attention has been particularly focussed upon the problem of providing means for dealing with flux jumps occurring in the superconducting material of the conductor. Flux jumps occur when the environment to which the conductor is subjected is changing, particularly as regards changes in the magnetic field to which the conductor is subjected and in the resulting current passing through the superconducting material. A result of each flux jump is that a quantity of thermal energy is emitted, such that there is the danger that the portion of the superconducting material which experiences this thermal energy will change to its non-superconducting state, and because its electrical resistance then becomes appreciable whereby further heat is generated, the non-superconducting state may be propagated through substantial portions of the conductor.

Expedients which have been used to attempt to deal with flux jump problems have typically been the provision of substantial quantities of a non-superconductive metal, by which is meant a metal which does not have superconducting properties at temperatures of the order of 4.2° K, these metals being selected for their high thermal and electrical conductivity properties. The non-superconductive metal is located in good thermal and electrical contact with the superconductor material, and acts to conduct away and absorb the thermal energy generated by flux jumps, and also to provide a relatively low electrical resistance shunt path enabling the electrical current passing along the conductor temporarily to by-pass any portion of the superconductive material which is not superconducting.

It is an object of the invention to provide an electrical conductor having superconductive properties and which will be intrinsically stable in that, in normal use at temperatures of about 4.2° K, flux jumps are minimized whereby the problems associated with flux jumps are reduced, and any flux jumps that occur will not produce instability.

SUMMARY OF THE INVENTION

In accordance with the invention an electrical conductor comprises at least one core having superconductive properties and embedded in a matrix of a plastic material (as hereinafter defined), said core comprising at least one filament which is of superconductive material and has a maximum thickness of five microns.

Preferably said filament has a maximum thickness of 1 micron.

In this specification, the term "plastic material" means a nonmetallic dielectric substance which is capable of undergoing plastic flow. Typical examples of plastic materials are crystalline or amorphous polymers, glasses and mica.

By virtue of the superconductor filament or filaments having a maximum thickness of 5 microns or preferably 1 micron, without prejudice to the present invention it is thought that any flux jump will liberate insufficient thermal energy to drive the superconductor material into its normally conducting state. The plastic material provides support for the superconductor material and acts as an electrically insulating medium for the filament or filaments.

The or each core may be provided in at least two different forms of which the first and simplest is that form in which the core comprises a single superconductor filament. In this case the filament is preferably continuous such that it is uninterrupted along the conductor, but alternatively it is discontinuous with interruptions spaced along it, each interruption being less than 1 micron in length. Such an interruption can readily be bridged by the superconductor current.

In the second form of the or each core, the core comprises a plurality of randomly interconnected superconductor filaments which, as in the first case, are preferably continuous to produce a number of uninterrupted electrical paths along the conductor, but alternatively the filaments are discontinuous with interruptions along the filaments, each interruption being less than one micron in length.

For any form of the or each core, it is preferred that the core shall consist solely of said at least one superconductor filament, but alternatively the core may also comprise a metallic sub-structure supporting the or each superconductor filament of the core. If the or each superconductor filament is an alloy or intermetallic compound, the metallic sub-structure may comprise a constituent of said alloy or compound respectively.

The matrix of a plastic material may be a homogeneous solid which is capable of undergoing plastic flow, or a particulate solid which is capable of undergoing plastic flow or a coalesced solid which is only capable of undergoing plastic flow when in the particulate state.

In accordance with the invention also, a method of manufacturing an electrical conductor comprises embedding in a matrix of a plastic material (as hereinbefore defined) at least one core having or capable of having superconductive properties, and deforming the matrix and said core to reduce their cross-sectional dimensions to such a degree that said core comprises or is capable of comprising at least one superconductor filament having a maximum thickness of five microns.

Preferably said deformation is such that said filament has a maximum thickness of one micron.

Preferably also said core does comprise at least one superconductor filament, but alternatively the core is capable of comprising at least one superconductor filament, meaning that the core contains the constituents of a superconductor material, and that that superconductor material is only produced by means of a suitable heat treatment subsequent to the deformation of the matrix and the core. The heat treatment is selected to be appropriate to the interdiffusion of the constituents of the superconductor material whereby either a superconductor alloy or a superconductor intermetallic compound, as appropriate, is produced by the heat treatment. If the core does comprise at least one superconductor filament, a typical example of an appropriate superconductor material is the ductile superconductor alloy niobium 44 weight, percent titanium. If the core is capable of comprising at least one superconductor filament, a typical superconductor alloy which can be produced by a heat treatment is molybdenum 50 atomic percent rhenium, and a typical example of a superconductor intermetallic compound is $SiV_3$.

Preferably the matrix and the or each core are selected so as to have very similar working properties whereby they can be deformed readily and will reduce in their cross-sectional dimensions equally. This may necessitate deformation at an elevated temperature in order to obtain those properties. In this way an isotropic composite of the matrix and the core or cores is achieved.

Thus a polymer can be chosen that is either crystalline or amorphous. If it is crystalline, its crystalline melting point should be below the melting point of the core so that any orientation induced in the polymer during drawing down operations can be annealed out by heating to a temperature above the crystalline melting point but below the melting point of the core. Similarly, if the polymer is amorphous the melting point of the core should be higher than that temperature which, in the annealing time scale available, will allow disorientation of molecules of the polymer, aligned during deformation, to take place in the visco-elastic state of the polymer.

The annealing step may be essential when working with crystalline polymers below their crystalline melting point, since at these temperatures, the polymer will have a natural draw rate limit normally between 3:1 and 8:1. Thus greater reductions will require interstage annealing of the polymer. This does not apply if the deformation is carried out above the recrystallization temperature of the polymer. This will also apply to an amorphous polymer worked well below the temperature at which molecular disorientation occurs. Due to the elastic memory of polymers, they will tend to revert to their original bulk shape during annealing; the metal can act as a restraint maintaining the dimensions of the wire.

In accordance with the present invention also, a method of manufacturing an electrical conductor comprises producing an assembly of a ductile container; a plastic material matrix (as hereinbefore defined) in particulate form, the particles having a high modulus and low ductility, within the container; and at least one core having or capable of having superconducting properties embedded in and impermeable by the particulate matrix; followed by deforming the assembly at such a temperature that the particulate nature of the matrix is retained to reduce the cross-sectional dimensions of the assembly to such a degree that the core comprises or is capable of comprising at least one superconductor filament having a maximum thickness of five microns.

It is the matrix which has the properties of a plastic material used to define it above, the particulate nature of the matrix enabling it to undergo plastic flow so that deformation of the assembly will have the effect of highly compressing the particles of plastic material against one another and sliding them over one another. The compressive and tractive forces generated by compression and interface sliding respectively, will lengthen the matrix as its cross-sectional dimensions are reduced, and because of the low ductility of each particle of the plastic material, the particles will readily facture to create new surfaces sliding over each other. The condition of retention of the particulate nature is required to stop the particles from welding together. At the same time, compressive and tractive forces are transmitted between the container, for example an extrusion can, and the core or cores by the particles. This will provide for deformation of the container and the core or cores to reduce their cross-sectional dimensions.

The selection of the particulate material to be used depends to some degree upon the subsequent treatments to which the electrical conductor is to be submitted. For example, it may be required that the particles of the matrix be fused together when deformation has been completed by a suitable heat treatment. In addition, the superconductor material may require a heat treatment either to confer superconducting properties, or to develop them to the desired degree. Accordingly, the particulate material readily falls into one of two classes and selection will normally be confined to a material in one class, according to the other requirements.

The first class is that in which the plastic material matrix is a glass, and this will apply generally to a mica powder also. The use of a powdered glass will provide a large range of deformation temperatures during which the glass particles will readily fracture, and they will not fuse together. Examples of such glasses are the alumino-silicate type of glasses which have a softening point of about 930° C., such that particle fusion will occur at about 1,100° C. If this type of glass is used, the assembly can be worked at temperatures up to about 900° C., for example if these temperatures are required to provide ready deformation of the container and the core or cores. This may be necessary for relatively hard superconductor alloys. For the superconducting alloy niobium 44 weight percent titanium, a typical maximum working temperature is 500° C. Consequently at this and lower temperature, the alumino-silicate type glass powders will readily function in the required manner. When deformation has been completed, the glass particles can be fused together at a temperature of about 1,100° C.

Fusion of a glass matrix is not always desirable because it will obviously decrease the flexibility of the electrical conductor, the flexibility decreasing in proportion to the square of the diameter of the conductor. Thus, it may be preferred to leave the matrix in a compressed powder form.

Other glass powders are listed in Table I below, together with the temperatures of their nominal softening point and the range for fusion.

TABLE I

| Composition of glass | Nominal softening point, ° C. | Range of temp. for fusion, ° C. |
|---|---|---|
| 8% BaO, 83% $V_2O_5$, 9% $P_2O_5$ | 200 | 635-650 |
| 87.4% PbO, 12.5% $B_2O_3$ | 360 | 510-600 |
| 80% PbO, 20% $B_2O_3$ | 320 | 470-520 |
| Polyphosphate derivative of cetyl pyridinium bromide | | (1) |
| 25.0% $K_2O$, 6.5% CaO, 4.5% MgO, 19.0% $B_2O_3$, 45% $SiO_2$ | | 930-1,030 |
| 14.4% $Na_2O$, 0.5% $K_2O$, 0.4% BaO, 2.25% MgO, 1.8% $Al_2O_3$, 0.2% $Fe_2O_3$, 77.5% $SiO_2$ | | 1,200-1,435 |

[1] Max. temp. 240° C. before decomposition.

The second class is that in which the plastic matrix material is a polymeric powder. For the deformation of the assembled components of the electrical conductor, the same basic requirements apply to the thermoplastic powder as to the glass powder. Thus it must be of a high modulus and low ductility, to permit ready fracture of the particles in compressive and tractive forces, and the particles must not weld one to another. One possible advantage held by the thermoplastic powder matrix is that it can be readily coalesced at relatively low temperatures, such as those temperatures which are frequently used to develop the maximum superconductor properties in the superconductor material. An example is a heat treatment of 400° C. for niobium-titanium superconductor material. In this way, once deformation has been completed, the superconductor material can be given the requisite heat treatment, and at the same time the plastic powder is coalesced into a bulk solid, which will thereby be likely to provide better electrical insulating properties than those which rely upon the internal pressure between separate glass particles. A further benefit is that the coalesced matrix will probably have a reasonable flexibility, such that it will not impair the handling characteristics of the eventual electrical conductor.

DESCRIPTION OF EMBODIMENTS

Typical embodiments of the invention will now be described.

In the first embodiment of the invention a solid homogenous plastic matrix is provided in the form of a cylindrical billet into holes in which are passed a number of rods of a ductile superconductor material. The billet with its rods is then inserted in an extrusion can of a suitable material, and the can is preferably evacuated and sealed.

Extrusion is then carried out at an elevated temperature, which will be discussed below, with a typical extrusion ratio of about 5:1.

The extrusion is submitted to a number of drawing passes through a series of reducing dies, still being maintained at the original temperature. Each drawing pass produces a typical reduction in the cross-sectional dimensions of both the billet and each superconductor rod of about 15 percent.

The drawing process is continued either until each superconductor rod has been reduced in diameter to about one micron, but alternatively when each superconductor rod has reached a diameter of about 100 microns, the extrusion can is removed, the plastic with its superconductor rods is cut typically into 10 lengths, and these are assembled side by side in a further extrusion can of the same material as that first used. This new assembly is then extruded and drawn at an elevated temperature as described above, and drawing is continued until the desired filament size of one micron is reached for each superconductor filament.

The selection of the plastic material and the superconductor material is carefully made to ensure that those materials can be worked together and will deform readily at the same rates at an appropriate temperature. Preferably, the way in which this selection is made is that a superconductor material is chosen with the intention that it shall be extruded and drawn at a temperature above its recrystallizing temperature and below its melting point. This means that the superconductor material can be deformed indefinitely without any work-hardening, because deformation at a temperature above its recrystallization temperature means that it is self-annealing.

There is then chosen a plastic material of which the crystalline melting point is preferably between the deformation temperature and the melting point of the superconductor material. Alternatively, the plastic material can be one of which the crystalline melting point is below the deformation temperature but which does not have too low a viscosity at the deformation temperature. In the first alternative, the superconductor and plastic materials can be worked together to an extension ratio of between 3:1 and 8:1, whereupon annealing will be required in order to remove any orientation induced in the plastic material as a result of the deformation. If the plastic material is an amorphous thermoplastic material, this annealing will permit disorientation of the molecules oriented in the deformation. In the second alternative, because deformation is being carried out at above the crystalline melting point, there will be no orientation of the molecules and annealing will not be required. In this situation, the superconductor and plastic materials can be worked together with the absolute minimum of work-hardening characteristics and they preferably have approximately the same ductility.

The material of the extrusion can is then chosen to be one which will deform readily at that temperature, but will be strong enough to contain the plastic and superconductor materials.

There follows in Table II a list of superconductor materials with their melting points, and in Table III a list of polymers with their annealing and working temperatures. The "Bulk Tc" of the superconductor material is also noted, this being the critical temperature in zero magnetic field of the superconductor material when it is in bulk form.

TABLE II

Table of Superconducting Alloys Suitable for Processing with Polymers

| Alloy | M.P. | Bulk Tc |
|---|---|---|
| InSn | 117°C | 4–7°K |
| PbBi | 125°C | 8°K |
| In | 156°C | 3.4°K |
| PbSn | 183°C | 4°K |
| Sn | 230°C | 3.7°K |
| CdPb | 248°C | 4°K |
| Pb | 327°C | 7.2°K |

TABLE III.—POLYMER ANNEALING AND WORKING TEMPERATURES

| Polymer | Typical crystalline melting point, ° C. | Typical heat distortion temp. ° C., ASTMD 648 | Typical working range, ° C. |
|---|---|---|---|
| Crystalline: | | | |
| Low density polythene | 110–115 | | 90–120 |
| High density polythene | 125–135 | | 100–150 |
| Polypropylene | ca. 165 | | 150–185 |
| Polyacetals | 164–175 | | 140–190 |
| Nylon 11 | 185–187 | | 160–190 |
| Poly (4 methyl pentane-1). | ca. 245 | | 220–255 |
| Nylon 6 | 252–253 | | 220–255 |
| Fluorinated ethylene propylene polymers. | 285–295 | | 250–310 |
| Amorphous: | | | |
| Polymethyl methacrylate | | 71–113 | 120–160 |
| Acrylonitrile-butadiene-stryene polymers | | 105–123 | 120–200 |
| Polycarbonate | | 140–146 | 180–320 |
| Polysulphone | | ca. 175 | 220–370 |

For the superconductor and plastic materials given in Tables II and III suitable extrusion can materials are copper, cupro-nickel (copper 25 weight percent nickel) and aluminum. If greater strength is required for the extrusion can, stainless steel can be used.

By carrying out the deformation to produce a superconductor filament size of about one micron, the thermal energy liberated by any flux jump should be absorbed by the superconductor filament concerned without exceeding the critical temperature of the superconductor material in which case no instability will ensue. In addition, because each superconductor filament is effectively insulated from all of the other superconductor filaments by plastic matrix, there will be no flux linkage between the superconductor filaments, and this will eliminate a further source of flux jumps. To ensure that there can be no flux linkage between various superconductor filaments, the electrical conductor is preferably twisted at a nominal twist rate, for example one complete turn per 2 cm.

A typical example within this first embodiment of the invention is the case in which lead bismuth alloys are used in conjunction with polythene matrices. For bismuth contents of between 20 and 80 weight percent the eutectic point of this alloy is about 125° C., such that the alloy can be worked almost indefinitely just below that temperature without suffering any work-hardening effects. Hence low density of polythene which has a crystalline melting point of 110°–115° C. can be used in conjunction with the lead bismuth superconductor alloy, all of the working being effected at about 100° C. In addition, at this temperature the polythene has approximately the same ductility as the lead bismuth alloy. Consequently, the lead bismuth superconductor rods which are inserted in the low density polythene billet can be readily reduced to a filament diameter of about one micron, with annealing stages at 120° C. after every 5:1 reduction. There can be used a copper extrusion can, and the copper may be either removed or permitted to remain to strengthen the electrical conductor and to act as a safety shunt in the result of gross breakage of the super-conductor filaments.

As thus far described, the superconductor materials have all had melting points of about 300° C. or lower, but this embodiment of the invention can be extended to higher melting point ductile superconductor materials, provided that in each case a suitable plastic matrix material is selected. As an example, the superconductor material can be niobium 44 weight percent titanium which has a melting point of 1,700° to 1,900° C. This can be worked upon at 1,200° C. with a suitable silicatype glass in an extrusion can of a metal which will be satisfactory at such temperatures, for example stainless steel. By working the superconductor material at this temperature, it will have virtually no work-hardening properties and the plastic material can be chosen so as to give an isotropic composite.

In a second embodiment of the invention, the working processes described in the first embodiment are used, but the superconductor material is one which is only formed after all deformation processes and by a suitable heat treatment. Thus, until that stage, there is present no superconductor material as such, but only the constituents of a superconductor material.

The constituents of the superconductor material may be present in the bulk solid state, for example as vanadium and silica. In this case a number of vanadium rods are located in a billet of a silica glass which will deform at the same rate as the rate of deformation of vanadium at a temperature of for example 600° C.

When the deformation processes have been completed, the electrical conductor, still provided with its extrusion can, is heat treated at a temperature of about 1,000° C for about one hour to cause the vanadium and silicon from the silica to react to produce the superconductor intermetallic compound $VSi_3$.

Alternatively, one of the constituents of the superconductor material can be bulk solid and the rest in a powder form. In this instance, the mechanical properties of the powder are not critical as regards deformation at the same rate as the plastic material because each powder particle is probably merely sliding over other particles during the deformation processes, and is not itself extended. In this alternative, the solid constituent can be niobium, for example initially in the form of a narrow bore tube, and the powder constituent can be aluminum powder within each niobium tube. Again after the required deformation, the above heat treatment is applied to produce $AlNb_3$. It is arranged that not all of the niobium is consumed into the compound $AlNb_3$, most of the tube remaining to provide additional support for the $AlNb_3$. The matrix is a glass having a softening temperature of about 500° C.

In a third embodiment of the invention, each superconductor filament does not exist as the sole constituent of an original corresponding core, but rather the core is in the form of a mixture of particles of either the superconductor material and a metallic sub-structure material, or it is in the form of mixed powders of the constituents of an eventual superconductor alloy or intermetallic compound.

A typical example of the first instance of this third embodiment is one in which each core consists of a mixture of powders of niobium and copper, deformation of the composite being continued with the extension of each core by the continual sliding of the powder particles one over another, until each particle of niobium is located as a constituent in an interconnecting network. This produces a sponge-like structure in which each pore is constituted by a copper particle, and the interconnecting network consists of the niobium powder, the powder size being such that the filamentary structure in the niobium has a maximum thickness of about 1 micron. The filamentary niobium structure is preferably continuous to provide a number of continuous electrical paths throughout the length of the conductor, but interruptions can be tolerated provided that each is less than one micron in length.

In the second instance of the third embodiment, the powders are of the constituents of the eventual superconductor alloy or intermetallic compound, and during the working process the powders are intimately mixed with each other to provide a continuous network of contact surfaces extending throughout the length of the conductor. A suitable heat treatment will produce interdiffusion between the constituents with the production of an interconnecting network of the superconductor alloy or intermetallic compound. As an example, the powders can be of molybdenum and rhenium whereby the superconductor alloy molybdenum 50 atomic percent rhenium is produced at the interfaces. As a further example, there can be present more than two constituents, these being chosen so that one of the constituents can be wholly absorbed within the other two constituents, and these will then interdiffuse, to produce the triple constituent superconductor alloy or intermetallic compound. A typical example is niobium with silicon and vanadium.

A typical example of a method of manufacturing an electrical conductor with the use of a glass powder matrix will now be described.

A cupro-nickel extrusion can is provided with an array of sixteen rods of the superconductor material niobium 44 weight percent titanium. These are jigged in position and are subsequently surrounded and separated from one another by the packing of the interior of the extrusion can with a slurry of an alumino-silicate type of glass in a volatile solvent. The solvent is evaporated away, and the extrusion can is then evacuated and closed. The assembly of the extrusion can, the glass powder, and the rods of superconductor material, is then extruded at normal ambient temperatures and is subsequently drawn at normal ambient temperatures to such a degree that the rods of superconductor material are of a maximum thickness of 5 microns. Preferably, the maximum thickness of each rod is about 1 micron.

In a modification of this example, the same arrangement of extrusion can and superconductor rods is used, but the glass powder is injected into the extrusion can in combination with a carrier material which remains in place and is used as an integral part of the powder matrix. To accomplish this, a paste of glass powder with sodium silicate is used to coat the niobium-titanium rods and to pack the whole of the interior of the extrusion can. The sodium silicate is dehydrated by heating, and this results in a friable material with sufficient mechanical strength to separate the superconductor rods during the producing of the assembly. Thus, no jigging is required. After evacuation and sealing of the extrusion can, it is deformed in the same way as that just described, the bonding effect of the sodium silicate soon being eliminated during the compression and extension of the matrix.

Listed below in Table IV are examples of polymeric materials which can be used in conjunction with the quoted superconductor materials in order to provide an electrical conductor in which the superconducting filaments are of the requisite size, i.e., less than 5 microns, and preferably one micron, are also in the correct metallurgical condition for best superconducting properties, and are supported and electrically insulated by a coherent but flexible matrix of thermoplastic material. In the Table IV, column $T_{co}$ is the temperature range within which the polymer particles will coalesce.

TABLE IV

| Superconductor | Polymer | Drawing temp., ° C. | $T_{co}$ in ° C. | Superconductor conditioning temp., °C. |
|---|---|---|---|---|
| Nb 44 wt. percent Ti | Certain polymides, e.g., Rhone Poulare resin M-33 ( a poly bismaleimide). | 20–200 | 250–300 | About 400. |
| Pb | Polyamides, e.g., "Maranyl" A108* | 20–200 | 265–300 | Melting point <327° C. |
| Sn | Polystyrenes and polymethylmethacrylates | 20–80 | 150–200 | Melting point <231° C. |

*A poly (hexamethylene-adipamide) lubricated by graphite and molbydenum disulphide.

We claim:

1. A method of manufacturing an electrical conductor comprising embedding in a matrix of a plastic material at least one core having superconductive properties and deforming the matrix and said core to such a degree that said core comprises at least one superconductor filament having a maximum thickness of 5 microns, the matrix and the core having similar working properties and being deformable at such a temperature that they will deform readily and reduce in their cross-sectional dimensions equally.

2. A method as in claim 1 wherein the matrix of a plastic material is a homogeneous solid which is capable of undergoing plastic flow.

3. A method as in claim 1 wherein the matrix of a plastic material is a particulate solid which is capable of undergoing plastic flow.

4. A method as in claim 1 wherein the matrix of a plastic material is a coalesced solid which is only capable of undergoing plastic flow when in the particulate state.

5. A method as in claim 1 wherein the plastic material is a crystalline polymer having a crystalline melting point lower than the melting point of the or each core.

6. A method as in claim 1 wherein the plastic material is an amorphous polymer and the core has a melting point higher than that temperature which will allow disorientation of molecules of the polymer to take place in the visco-elastic state of the polymer.

7. A method as in claim 1 wherein the core comprises a plurality of randomly interconnected continuous superconductor filaments producing a number of uninterrupted paths along the conductor.

8. A method as in claim 1 wherein the core comprises a plurality of randomly interconnected superconductor filaments, said filaments being discontinuous with interruptions spaced along the filaments, each interruption being less than one micron in length.

9. A method as in claim 1 wherein the core also comprises a metallic sub-structure supporting the or each filament of the core.

10. A method as in claim 9 wherein the or each superconductor filament is an alloy or intermetallic compound and the metal sub-structure comprises a constituent of said alloy or compound.

* * * * *